United States Patent [19]

Love

[11] 3,922,320

[45] Nov. 25, 1975

[54] IMPACT-RESISTANT VINYL HALIDE RESIN COMPOSITIONS CONTAINING A STYRENE-BUTADIENE-ALKYL METHACRYLATE POLYMER AND A STYRENE-ACRYLONITRILE COPOLYMER

[75] Inventor: Fred E. Love, Denver, Colo.

[73] Assignee: Tenneco Chemicals, Inc., Saddle Brook, N.J.

[22] Filed: May 21, 1973

[21] Appl. No.: 362,311

[52] U.S. Cl. ... 260/876 R; 260/23 XA; 260/23 AR; 260/235; 260/23 H; 260/23.7 H; 260/23.7 N; 260/28.5 D; 260/42.49; 260/45.7 P; 260/45.75 V; 260/879; 260/880 R; 260/890; 260/893; 260/898; 260/899

[51] Int. Cl.² .................. C08L 51/00; C08L 53/00

[58] Field of Search ................ 260/876 R, 881, 880

[56] References Cited
UNITED STATES PATENTS

| | | | |
|---|---|---|---|
| 3,644,577 | 2/1972 | Lee et al. | 260/876 R |
| 3,671,610 | 6/1972 | Amagi et al. | 260/876 R |
| 3,678,132 | 7/1972 | Isogawa et al. | 260/876 R |
| 3,775,514 | 11/1973 | Amagi et al. | 260/876 R |
| 3,780,134 | 12/1973 | Lonning | 260/876 R |

Primary Examiner—Richard B. Turer
Attorney, Agent, or Firm—Evelyn Berlow

[57] ABSTRACT

Resinous compositions that have excellent melt flow characteristics and high impact resistance contain 70 to 90 percent by weight of a vinyl halide resin, 5 to 15 percent by weight of an elastomer that is a styrene-butadiene-alkyl methacrylate polymer or a partially cross-linked alkyl methacrylate polymer, and 5 to 15 percent by weight of a thermoplastic resin that is a styrene-acrylonitrile copolymer or a styrene-acrylonitrile-alkyl methacrylate terpolymer.

5 Claims, No Drawings form to the vinyl halide resin suspen-
IMPACT-RESISTANT VINYL HALIDE RESIN COMPOSITIONS CONTAINING A STYRENE-BUTADIENE-ALKYL METHACRYLATE POLYMER AND A STYRENE-ACRYLONITRILE COPOLYMER This invention relates to vinyl halide resin compositions that have excellent impact strength and processing characteristics.

Rigid vinyl halide resin compositions, that is, compositions that contain less than about 10 percent of plasticizer, are characterized by a high degree of resistance to chemical attack, by outstanding solvent resistance, by good resistance to weathering, and by a high strength to weight ratio. Consequently, these compositions are widely used in the chemical processing and construction industries in such applications as pipes and pipe fittings, moldings, sheeting, building panels, and the like. The processing of rigid vinyl halide resin compositions is, however, often difficult. Since the vinyl halide resins have relatively poor heat stability, there are strict limitations on the temperatures at which they can be processed. Under such processing conditions, vinyl halide resins have poor flow characteristics, and satisfactory extruded end products often cannot be obtained. In addition, rigid vinyl halide resin compositions generally have insufficient impact resistance and heat distortion characteristics for many applications.

A wide variety of materials have been compounded with vinyl halide resins in attempts to improve upon one or more of their deficient characteristics. Butadiene polymers and other elastomers have been used to improve the impact resistance and heat distortion temperatures of the compositions. In the amounts used for these purposes, the elastomeric modifiers frequently have an adverse effect on the flow characteristics of the compositions such that it is difficult to produce by extrusion or injection molding objects with intricate shapes with sufficient control of their dimensions. For example, elastomer-modified compositions generally exhibit a viscous, laminar flow pattern during extrusion, which results in greater flow of material from the center of the die then from the edge and in the production of profiles having poor die fidelity. It is not economical or desirable either to modify the die design to compensate for the difference in melt viscosity across the profile or to extrude so slowly that the differences in flow rates become unimportant. There is therefore a need for a vinyl halide resin composition that has good impact resistance and good flow characteristics, and particularly that exhibits no velocity gradient across the flow path during extrusion. In the past this need has been met only by modifying the compositions with relatively expensive acrylonitrile-butadiene-styrene polymers or by adding the impact modifier and flow modifier in emulsion form to the vinyl halide resin suspension prior to drying, both of which add appreciably to the cost of the resin.

In accordance with this invention, it has been found that vinyl halide resin compositions that contain 70 to 90 percent by weight of a vinyl halide resin, 5 to 15 percent by weight of an elastomer that is a styrene-butadiene-alkyl methacrylate polymer or a partially cross-linked alkyl methacrylate polymer, and 5 to 15 percent by weight of a thermoplastic resin that is a styrene-acrylonitrile copolymer or a styrene-acrylonitrile-alkyl methacrylate terpolymer have an unusual and valuable combination of properties. These compositions can be extruded or injection molded to form complicated shapes without the use of elaborate tooling or sizing equipment. The products obtained are characterized by high impact strength and rigidity, high heat distortion temperatures, excellent die fidelity, smooth surfaces, and good electrical properties. Compositions that have a particularly good combination of processing characteristics and physical properties contain 80 to 85 percent by weight of a vinyl halide resin, 10 to 15 percent by weight of the elastomer, and 5 to 10 percent by weight of the thermoplastic resin. The best combinations of properties result when the composition contains about 80 percent by weight of polyvinyl chloride, 12 percent by weight of an elastomer that is obtained by grafting styrene and methyl methacrylate onto polybutadiene, and 8 percent by weight of a styrene-acrylonitrile copolymer.

The vinyl halide resins that may be used in the compositions of this invention are the resinous products obtained by the polymerization of a vinyl halide in the presence or absence of a copolymerizable monomer. The term "vinyl halide resin" as used herein includes vinyl halide homopolymers, such as polyvinyl chloride and polyvinyl bromide, as well as vinyl halide copolymers including those formed by the polymerization of a vinyl halide with a copolymerizable ethylenically-unsaturated comonomer. Among the useful comonomers are vinyl esters such as vinyl acetate, vinyl propionate, vinyl butyrate, vinyl stearate, allyl acetate, and isopropenyl acetate; vinylidene halides as, for example, vinylidene chloride and vinylidene bromide; acrylic esters such as methyl acrylate, ethyl acrylate, lauryl acrylate, stearyl acrylate, methyl methacrylate, ethyl methacrylate, and stearyl methacrylate; esters of dibasic acids such as diethyl fumarate, dibutyl fumarate, dilauryl fumarate, diethyl maleate, dibutyl maleate, and diethylhexyl maleate; $\alpha$-olefins such as ethylene, propylene, and isobutylene; alkyl vinyl ethers such as methyl vinyl ether; propyl vinyl ether, and isobutyl vinyl ether; styrene; acrylonitrile; and the like. The copolymers generally contain at least 70 percent of vinyl halide units and up to 30 percent of comonomer units. The vinyl halide that is usually used in the preparation of the resins is vinyl chloride. The preferred vinyl halide resins are homopolymers of vinyl chloride. Particularly preferred are polyvinyl chlorides prepared by suspension polymerization that have medium to high relative viscosity, that is, relative viscosity of about 2.0 to 2.8, and preferably 2.3 to 2.5, when measured at a 1 percent (wt./wt.) concentration in cyclohexanone at 25°C.

The elastomers that are used as the impact modifier in the compositions of this invention include methacrylate-butadiene-styrene polymers, partially cross-linked methacrylate polymers, and mixtures of these polymers. Illustrative of the methacrylate-butadiene-styrene polymers are methyl methacrylate-butadiene-styrene terpolymers, methyl methacrylate grafted onto a butadienestyrene copolymer, methyl methacrylate and styrene grafted onto polybutadiene, and methyl methacrylate and styrene grafted onto a butadiene-styrene copolymer. These polymers generally contain 15 to 30 percent of methyl methacrylate units, 40 to 65 percent of butadiene units, and 10 to 40 percent of styrene units. Particularly advantageous results have been obtained using an elastomer that is prepared by grafting methyl methacrylate and styrene onto polybutadiene and that contains about 25 percent of methyl methacrylate units, 60 percent of butadiene units, and 15 percent of styrene units.

The methacrylate polymers suitable for use in the present invention include partially cross-linked methyl methacrylate homopolymers and copolymers of methyl methacrylate with no more than about 25 percent of an alkyl acrylate, wherein the alkyl group has from 1 to 10 carbon atoms and is preferably methyl or ethyl. The methacrylate polymers are generally prepared by the suspension polymerization of methyl methacrylate or a methyl methacrylate-alkyl acrylate mixture in the presence of about 0.05 to 5 percent, preferably 0.1 percent to 3.5 percent of a polyfunctional monomer that serves as the cross-linking agent. The polyfunctional monomer is usually a polyacrylate, a polymethacrylate, or a polyvinylbenzene, such as 1,3-butylene glycol diacrylate, trimethylolpropane trimethacrylate, or divinylbenzene. The preferred methacrylate polymers are partially cross-linked polymethyl methacrylate and partially cross-linked methyl methacrylate copolymer with 5 to 15 percent of ethyl acrylate.

The thermoplastic resins that are used in the novel compositions are styrene-acrylonitrile copolymers that are compatible with the vinyl halide resin. The resins generally contain from 50 to 90 percent of styrene, methyl styrene, ethylstyrene, monochlorostyrene, or methoxystyrene units and 10 to 50 percent of acrylonitrile, methacrylonitrile, ethacrylonitrile, or chloroacrylonitrile units. The polymers may also contain from 5 to 30 percent of lower alkyl methacrylate units. The preferred thermoplastic resins are styrene-acrylonitrile copolymers that contain about 75 percent of styrene units and 25 percent of acrylonitrile units and methyl methacrylate-styrene-acrylonitrile copolymers that contain 10 to 25 percent of methyl methacrylate units, 50 to 70 percent of styrene units, and 20 to 35 percent of acrylonitrile units.

The high impact strength compositions of this invention generally contain one or more of the well known heat and light stabilizers for vinyl halide resins, including metal salts of carboxylic acids, e.g. cadmium, barium, andn zinc stearates, laurates, benzoates, naphthenates, and the like; organotin compounds such as dibutyl tin maleate, dibutyl tin dilaurate, dibutyl tin mercaptoacetate, and tin mercaptide; organic phosphites; 2,4-dihydroxybenzophenone; hydroquinone; and hydroxyphenylbenzotriazole. The compositions may also contain lubricants, for instance, synthetic waxes, mineral oils, metal stearates, metal palmitates and mixtures of saturated higher fatty alcohols, paraffin wax, and silicone oils; pigments; dyes; antioxidants; fillers; and the like in the amounts ordinarily used for these purposes.

The compositions of this invention can be prepared by any procedure that will yield an intimate mixture of the components. It is generally preferred to mix the components on a two-roll mill at a temperature from 300°F. to 400°F. for a time sufficient to form a homogeneous sheet. The composition may then be removed from the mill in the form of a sheet of the desired thickness which may be used as such or subjected to further treatment. Alternatively, the components can be mixed and then fused in equipment designed to produce either intermediates, such as pelletized compound, or finished shapes, such as sheets, profiles, or pipes.

EXAMPLE 1

A. A vinyl halide resin composition was prepared by blending together the following materials:

| | Parts by Weight |
|---|---|
| Polyvinyl chloride (relative viscosity of 2.50 as measured in a 1% solution in cyclohexanone at 25°C.) | 100 |
| Methyl methacrylate-butadiene-styrene terpolymer* | 15 |
| Styrene-acrylonitrile copolymer | 10 |
| Dibutyltin mercaptoacetate | 2 |
| Calcium stearate | 6 |
| Glyceryl monostearate | 3 |
| Montan wax | 0.5 |
| Titanium dioxide | 6 |

* An impact modifier which is a terpolymer formed by grafting methyl methacrylate and styrene onto butadiene rubber and which is sold as "KM-611" by Rohm & Haas Co.

The blend was charged to a two-roll, steam-heated mill whose roll surface was maintained at 340°F. The blend was milled for 5 minutes and then removed from the rolls as a flexible homogeneous sheet that was 45 mils thick.

B. The resulting sheet was evaluated by standard test methods. The physical properties of this composition and those required by ASTM Method D-1784 for a Type II, Grade 1 material are shown in Table I.

From these data, it will be seen that the composition of the present invention meets all of the established requirements for high impact polyvinyl chloride compositions. The composition is characterized by exceptionally good impact resistance, as measured by the Izod test.

C. An extrusion tests was carried out in which the composition of Example 1A and two comparative compositions were extruded through a flat-plate profile die on a 2.5 inch 24:1 L/D extruder. Comparative compositions I and II, which are of the types disclosed in U.S. Pat. Nos. 2,808,387 and 3,053,800, are typical of commercially-available polyvinyl chloride compositions that are used for making molded products that have high impact properties.

The dimensions of the die and of the extruded products are shown in Table II.

The composition of Example 1A produces an extrusion having much greater die fidelity than do the comparative compositions. Each of the comparative compositions showed considerable "center flow" during extrusion; that is, greater flow of material from the center of the die than from the edge.

Table I

| | Product of Ex. 1 | Required by ASTM D-1784 for Type II, Grade 1 Materials |
|---|---|---|
| Initial | | |
| Tensile yield (psi) | 6500 | 6000 |
| Tensile modulus (Kpsi) | 431 | 320 |
| Flexural yield (psi) | 9550 | — |
| Flexural modulus (Kpsi) | 392 | — |
| After ageing in 80% $H_2SO_4$ for 30 days at 60°C. | | |
| Flexural yield (psi) | 8300 | — |
| Retention (%) | 87 | 100 ± 25 |
| Flexural modulus (Kpsi) | 319 | — |
| Retention (%) | 81 | — |
| Weight change (%) | +13.24 | +15.0 to −0.1 |
| After ageing in ASTM No. 3 Oil for 30 days at 23°C. | | |
| Weight Change (%) | +0.044 | +10.0 to −0.1 |
| Deflection Temperature | 70 | 60 |

Table I-continued

| | Product of Ex. 1 | Required by ASTM D-1784 for Type II, Grade 1 Materials |
|---|---|---|
| (°C.) | | |
| Izod Impact (ft. lb./inch) | 22 | 5 |

Table II

| | Die Dimension | | Extruded Composition of Ex. 1A | | Extruded Comparative Composition I | | Extruded Comparative Composition II | |
|---|---|---|---|---|---|---|---|---|
| | Actual | Relative | Actual | Relative | Actual | Relative | Actual | Relative |
| Edge | 0.070 | 1.00 | 0.058 | 1.00 | 0.030 | 1.00 | 0.035 | 1.00 |
| Center | 0.070 | 1.00 | 0.064 | 1.10 | 0.035 | 1.17 | 0.042 | 1.20 |
| Center Rib | 0.141 | 2.15 | 0.115 | 1.98 | 0.117 | 3.90 | 0.147 | 4.20 |

EXAMPLE 2

A vinyl halide resin composition was prepared by blending together the following materials:

| | Parts by Weight |
|---|---|
| Polyvinyl chloride (relative viscosity of 2.50 as measured in a 1% solution in cyclohexanone at 25°C. | 100 |
| Methyl methacrylate-butadiene-styrene terpolymer | 15 |
| Methyl methacrylate-styrene-acrylonitrile terpolymer | 10 |
| Tin mercaptide stabilizer | 2 |
| Calcium stearate | 6 |
| Glyceryl monostearate | 3 |
| Calcium montanate | 0.5 |
| Titanium dioxide | 6 |

The blend was charged to a two-roll, steam-heated mill whose surface was maintained at 350°F. The blend was milled for 5 minutes and then removed from the rolls as a flexible homogeneous sheet that was 45 mils thick. The sheet was found to have smooth surfaces, high impact strength and rigidity, and excellent electrical properties.

EXAMPLE 3

A vinyl halide resin composition was prepared by blending together the following materials:

| | Parts by Weight |
|---|---|
| Polyvinyl chloride (relative viscosity of a 1% solution in cyclohexanone of 2.50 at 25°C.) | 100 |
| Cross-linked polymethylmethacrylate | 13 |
| Styrene-acrylonitrile copolymer | 12 |
| Tin mercaptide stabilizer | 2 |
| Montan wax | 0.5 |

The blend was milled by the procedure described in Example 2. The composition was processed easily and formed clear products having very high impact strength and rigidity.

EXAMPLE 4

A vinyl halide resin composition was prepared by blending together the following materials:

| | Parts by Weight |
|---|---|
| Polyvinyl chloride | 100 |
| Cross-linked methyl methacrylate copolymer with 10 percent of ethyl acrylate | 13 |
| Styrene-acrylonitrile copolymer | 7 |
| Dibutyltin bis(isooctyl maleate) | 2 |
| Tris(nonylphenyl)phosphite | 0.5 |
| Titanium dioxide | 10 |
| Calcium stearate | 6 |
| Glyceryl monostearate | 3 |
| Calcium montanate | 0.5 |

The blend was milled by the procedure described in Example 2. The composition was processed easily and formed products having high impact strength and rigidity and excellent resistance to light and to weathering.

EXAMPLE 5

When the formulation described in Example 2 was modified by replacing the 6 parts of calcium stearate with 3 parts of zinc stearate, a composition was obtained that could be processed over a wide range of conditions without difficulty and without adversely affecting the physical properties of the resulting product.

What is claimed is:

1. An impact-resistant resinous composition consisting essentially of
   a. 70 to 90 percent by weight of a vinyl halide resin selected from the group consisting of polyvinyl halides and copolymers that contain at least 70 percent of vinyl halide units and up to 30 percent of copolymer units;
   b. 5 to 15 percent by weight of an elastomer that is the product obtained by grafting an alkyl methacrylate and styrene onto polybutadiene and that contains 10 to 40 percent of styrene units, 15 to 30 percent of alkyl methacrylate units, and 40 to 65 percent of butadiene units; and
   c. 5 to 15 percent by weight of a thermoplastic resin that is a styrene-acrylonitrile copolymer that contains from 50 to 90 percent of styrene, methylstyrene, ethylstyrene, monochlorostyrene, or methoxystyrene units and 10 to 50 percent by weight of acrylonitrile, methacrylonitrile, ethacrylonitrile, or chloroacrylonitrile units.

2. An impact-resistant resinous composition as defined in claim 1 that consists essentially of
   a. 80 to 85 percent by weight of a vinyl halide resin,
   b. 10 to 15 percent by weight of said elastomer, and
   c. 5 to 10 percent by weight of said thermoplastic resin.

3. An impact-resistant resinous composition as defined in claim 1 wherein the vinyl halide resin is polyvinyl chloride.

4. An impact-resistant resinous composition as defined in claim 1 wherein the elastomer is the product that is obtained by grafting methyl methacrylate and styrene onto polybutadiene and that contains 40 to 65 percent of butadiene units, 15 to 30 percent of methyl methacrylate units, and 10 to 40 percent of styrene units.

5. An impact-resistant resinous composition as defined in claim 1 that contains
   a. about 80 percent by weight of polyvinyl chloride,
   b. about 12 percent by weight of an elastomer that is the product that is obtained by grafting styrene and methyl methacrylate onto polybutadiene and that contains about 25 percent of methyl methacrylate units, 15 percent of styrene units, and 60 percent of butadiene units, and
   c. about 8 percent by weight of a styrene-acrylonitrile copolymer that contains about 75 percent of styrene units and 25 percent of acrylonitrile units.

* * * * *